United States Patent
Selyugin et al.

(10) Patent No.: US 9,827,737 B2
(45) Date of Patent: Nov. 28, 2017

(54) COMPOSITE STRUCTURAL ELEMENT AND TORSION BOX

(71) Applicant: Airbus Operations GmbH, Hamburg (DE)

(72) Inventors: Sergey Selyugin, Hamburg (DE); Jan-Ronald Balzer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 139 days.

(21) Appl. No.: 14/627,255

(22) Filed: Feb. 20, 2015

(65) Prior Publication Data

US 2015/0239207 A1 Aug. 27, 2015

(30) Foreign Application Priority Data

Feb. 21, 2014 (EP) .................................. 14 156 107

(51) Int. Cl.
*B32B 5/26* (2006.01)
*B29C 70/30* (2006.01)
(Continued)

(52) U.S. Cl.
CPC .............. *B32B 5/26* (2013.01); *B29C 70/202* (2013.01); *B29C 70/30* (2013.01); *B29C 70/543* (2013.01);
(Continued)

(58) Field of Classification Search
CPC .............. Y10T 428/24124; B32B 5/12; B32B 2605/18; B32B 2262/101;
(Continued)

(56) References Cited

U.S. PATENT DOCUMENTS 6,114,012 A  9/2000 Amaoka et al.
6,641,893 B1 * 11/2003 Suresh .................... C03C 14/00
                                                          428/105

(Continued)

FOREIGN PATENT DOCUMENTS

CN       101331002 A       12/2008
CN       101795850 A        4/2010
(Continued)

OTHER PUBLICATIONS

Machine translation of JP H09/001713A, obtained from Industrial Property Digital Library of the JPO dated Aug. 9, 2016.*

(Continued)

*Primary Examiner* — Aaron Austin
*Assistant Examiner* — Zheren J Yang
(74) *Attorney, Agent, or Firm* — Lorenz & Kopf, LLP

(57) ABSTRACT

This relates to a composite structural element, in particular a rib or a spar, specifically for use in a torsion box of an aircraft structure such as a vertical tailplane, wherein the structural element defines a coordinate system with a first axis "a" wherein the structural element comprises a substantially planar main section defining a coordinate system with a first axis "a" extending along the longitudinal axis "L" of the structural element and a second axis "b" extending perpendicular to said longitudinal axis "L" within the planar main section and defining an angle of +90° with the first axis "a", wherein the structural element contains a lay-up of single plies consisting of a fiber-reinforced composite material with a substantially unidirectional fiber orientation.

18 Claims, 6 Drawing Sheets

| Ply Thickness [mm] | | Layup Thickness [mm] | | | | | | | |
|---|---|---|---|---|---|---|---|---|---|
| 0.125 | 4,000 | 3,500 | 3,000 | 2,500 | 2,000 | 1,500 | 1,000 | (n.a.) |
| 0.180 | 5,760 | 5,040 | 4,320 | 3,600 | 2,880 | 2,160 | 1,440 | (n.a.) |
| 0.250 | 8,000 | 7,000 | 6,000 | 5,000 | 4,000 | 3,000 | 2,000 | 1,000 |
| Ply Orientation | Sequence Number | 32 | 28 | 24 | 20 | 16 | 12 | 8 | 4 |
| -20° | 1 | | | | | | | | |
| +40° | 2 | | | | | | | | |
| -20° | 3 | | | | | | | | |
| +40° | 4 | | | | | | | | |
| -20° | 5 | | | | | | | | |
| +40° | 6 | | | | | | | | |
| -20° | 7 | | | | | | | | |
| +40° | 8 | | | | | | | | |
| -20° | 9 | | | | | | | | |
| +40° | 10 | | | | | | | | |
| -20° | 11 | | | | | | | | |
| +40° | 12 | | | | | | | | |
| -20° | 13 | | | | | | | | |
| +40° | 14 | | | | | | | | |
| -20° | 15 | | | | | | | | |
| +40° | 16 | | | | | | | | |
| -20° | 17 | | | | | | | | |
| +40° | 18 | | | | | | | | |
| -20° | 19 | | | | | | | | |
| +40° | 20 | | | | | | | | |
| -20° | 21 | | | | | | | | |
| +40° | 22 | | | | | | | | |
| -20° | 23 | | | | | | | | |
| +40° | 24 | | | | | | | | |
| -20° | 25 | | | | | | | | |
| +40° | 26 | | | | | | | | |
| -20° | 27 | | | | | | | | |
| +40° | 28 | | | | | | | | |
| -20° | 29 | | | | | | | | |
| +40° | 30 | | | | | | | | |
| -20° | 31 | | | | | | | | |
| +40° | 32 | | | | | | | | |

(51) Int. Cl.
| | |
|---|---|
| B29C 70/54 | (2006.01) |
| B32B 5/12 | (2006.01) |
| B29C 70/20 | (2006.01) |
| B64C 3/20 | (2006.01) |
| B64C 3/18 | (2006.01) |
| B29K 105/10 | (2006.01) |
| B29K 307/04 | (2006.01) |
| B29L 31/30 | (2006.01) |

(52) U.S. Cl.
CPC ............... *B32B 5/12* (2013.01); *B64C 3/185* (2013.01); *B64C 3/187* (2013.01); *B64C 3/20* (2013.01); *B29K 2105/105* (2013.01); *B29K 2105/108* (2013.01); *B29K 2307/04* (2013.01); *B29L 2031/3076* (2013.01); *B32B 2260/021* (2013.01); *B32B 2260/046* (2013.01); *B32B 2262/106* (2013.01); *B32B 2305/08* (2013.01); *B32B 2307/542* (2013.01); *B32B 2307/544* (2013.01); *B32B 2605/18* (2013.01); *Y02T 50/43* (2013.01); *Y02T 50/433* (2013.01); *Y10T 428/24116* (2015.01); *Y10T 428/24124* (2015.01)

(58) Field of Classification Search
CPC . B32B 2262/106; B29C 70/202; Y02T 50/43; Y02T 50/433; B64C 3/20; B64C 2001/0072; B29K 2307/04
USPC .......................................................... 428/113
See application file for complete search history.

(56) References Cited

U.S. PATENT DOCUMENTS

| | | | |
|---|---|---|---|
| 7,806,367 B2 | 10/2010 | Munoz Lopez et al. | |
| 8,276,848 B2 | 10/2012 | Sagredo | |
| 8,556,213 B2 | 10/2013 | Markowski et al. | |
| 8,882,469 B2 | 11/2014 | Zuardy et al. | |
| 2001/0015043 A1* | 8/2001 | Brenneis | B64C 1/12 52/630 |
| 2003/0192990 A1* | 10/2003 | Simpson | B29C 37/0064 244/123.7 |
| 2008/0265094 A1* | 10/2008 | Van Der Veen | B23K 20/122 244/123.1 |
| 2009/0104398 A1* | 4/2009 | Kismarton | B29C 70/202 428/113 |
| 2009/0321985 A1 | 12/2009 | Aguado et al. | |
| 2010/0055384 A1* | 3/2010 | Doecker | B32B 3/12 428/113 |
| 2010/0233424 A1* | 9/2010 | Dan-Jumbo | B29C 70/202 428/113 |
| 2010/0308165 A1* | 12/2010 | Markowski | B29C 70/202 244/119 |
| 2010/0320320 A1* | 12/2010 | Kismarton | B29C 43/24 244/119 |
| 2011/0045232 A1* | 2/2011 | Kismarton | B29C 65/562 428/113 |
| 2011/0159242 A1* | 6/2011 | Arevalo Rodr guez | B29D 99/0003 428/157 |
| 2011/0210201 A1* | 9/2011 | Fews | B64C 25/52 244/108 |
| 2012/0020801 A1* | 1/2012 | Zuardy | B64C 3/20 416/223 R |
| 2012/0177872 A1* | 7/2012 | Tsai | B29C 70/202 428/113 |
| 2012/0193473 A1 | 8/2012 | Casado Abarquero et al. | |
| 2012/0211607 A1* | 8/2012 | Sanderson | B64C 3/185 244/35 R |
| 2013/0001356 A1 | 1/2013 | Llamas Sandin et al. | |
| 2013/0034684 A1* | 2/2013 | Meyer | B29C 70/202 428/113 |
| 2013/0075529 A1* | 3/2013 | Marcoe | B32B 1/08 244/131 |
| 2013/0129968 A1* | 5/2013 | Weidmann | B29C 70/025 428/113 |
| 2013/0327472 A1* | 12/2013 | De Mattia | B32B 37/0046 156/222 |
| 2013/0330503 A1* | 12/2013 | Kismarton | B32B 5/12 428/113 |
| 2014/0079903 A1* | 3/2014 | Hugon | B29C 65/5057 428/105 |
| 2014/0151507 A1* | 6/2014 | Woodard | B64C 3/26 244/133 |
| 2014/0170371 A1* | 6/2014 | Kamiya | B29C 70/222 428/113 |
| 2015/0030805 A1* | 1/2015 | Tsai | B32B 5/12 428/110 |
| 2016/0009368 A1* | 1/2016 | Kismarton | B32B 5/26 52/834 |

FOREIGN PATENT DOCUMENTS

| | | | | |
|---|---|---|---|---|
| CN | 102395458 A | | 3/2012 | |
| EP | 2492087 A1 | | 8/2012 | |
| FR | 2920743 A1 | | 3/2009 | |
| FR | 2956350 A3 | | 8/2011 | |
| JP | 09001713 A | * | 1/1997 | |
| NL | WO 2004071761 A1 | * | 8/2004 | ............... B32B 5/02 |
| WO | 2008019894 A1 | | 2/2008 | |

OTHER PUBLICATIONS

People's Republic of China, Chinese Office Action for Chinese Patent Application No. 201510087122.3 dated May 5, 2016.
European Patent Office, European Search Report for European Patent No. 14156107.6, dated Feb. 7, 2014.
A. Rothwell, Optimum Fibre Orientations for the Buckling of Thing Plates of Composite Material, The College of Aeronautics, Cranfied (Great Britain), Jun. 25, 1969.
Paul M. Weaver, On Optimisation of Long Anisotropic Flat Plates Subject to Shear Buckling Loads, University of Bristol, Bristol BS8 1TR, UK.

* cited by examiner

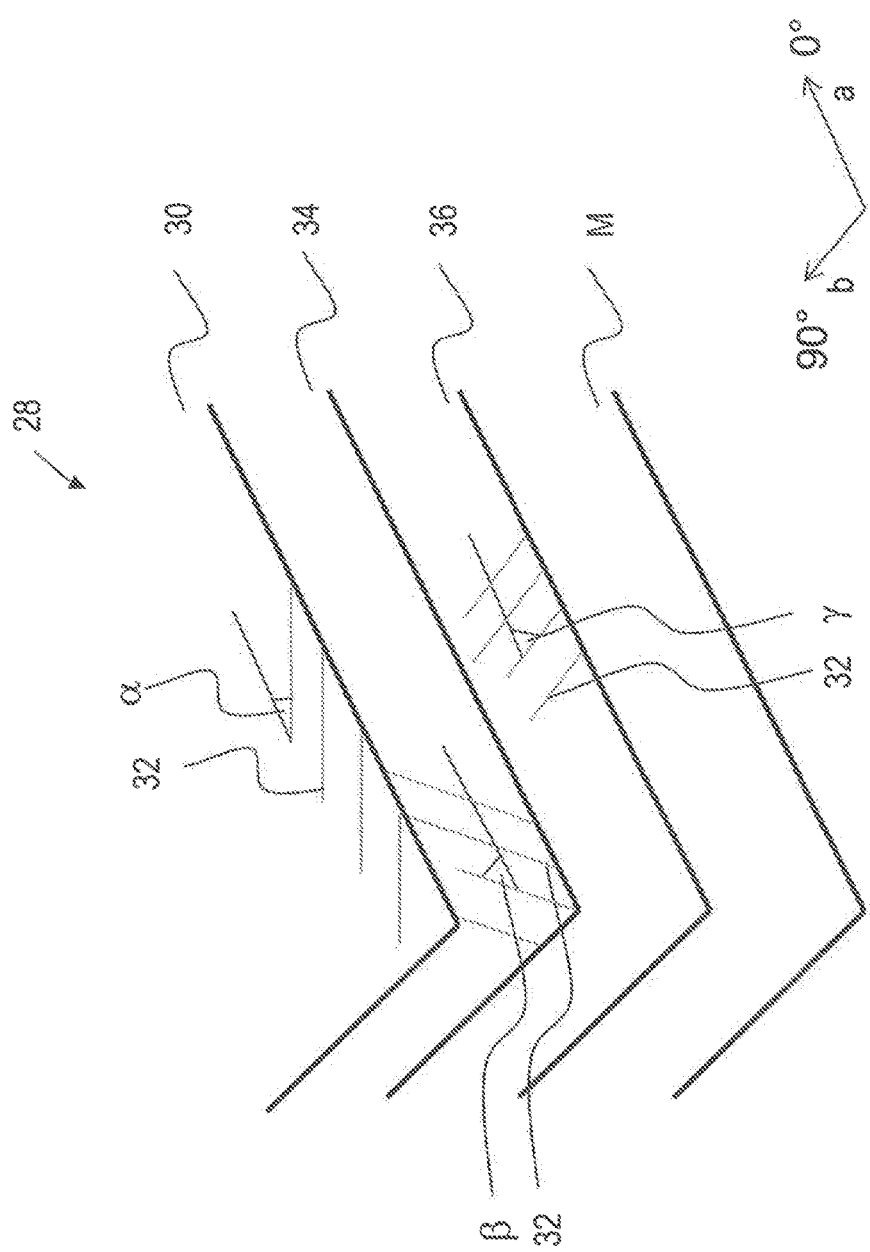

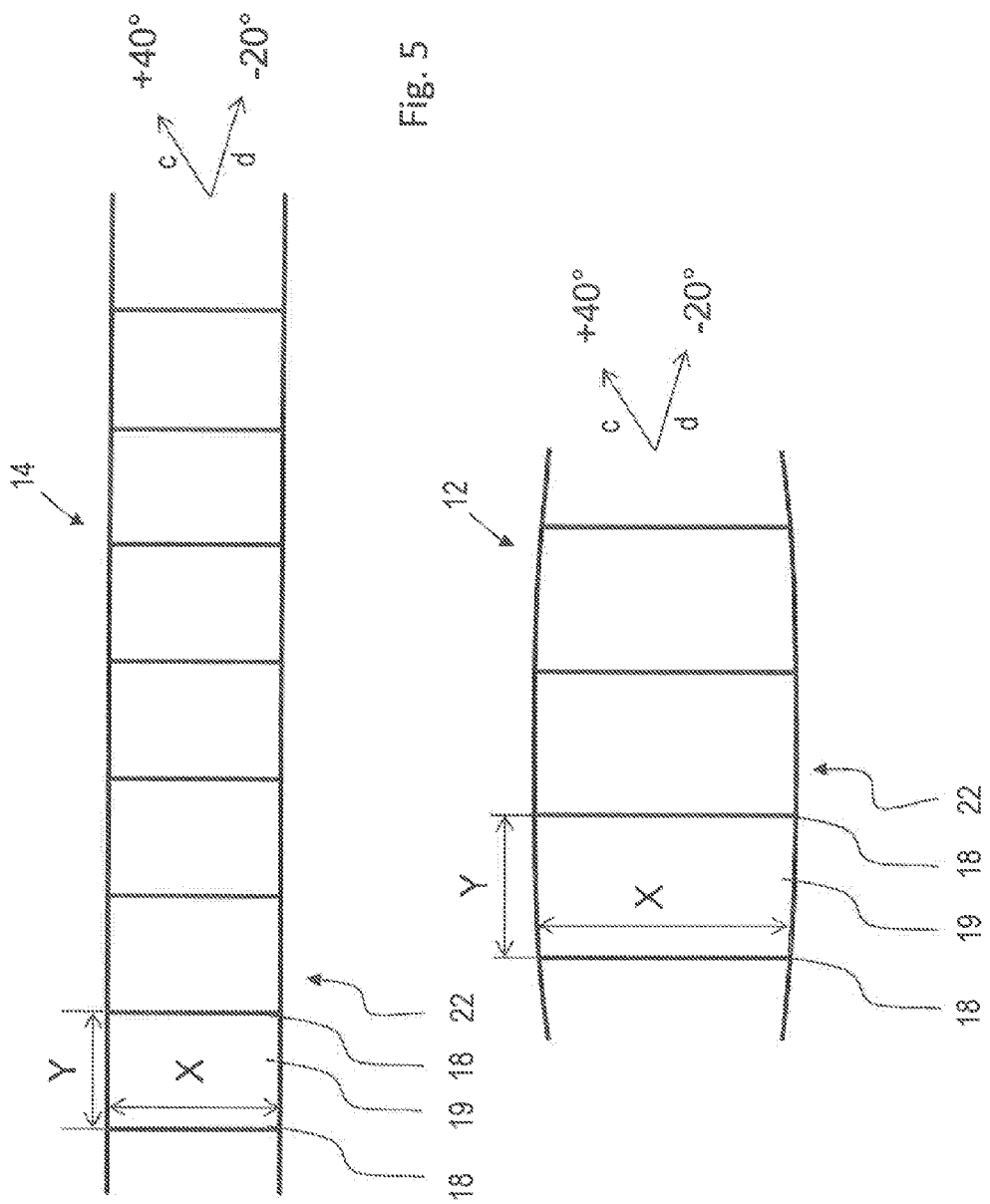

Fig. 7

| Ply Thickness [mm] | | | Layup Thickness [mm] | | | | | | | |
|---|---|---|---|---|---|---|---|---|---|---|
| 0.125 | | | 4,000 | 3,500 | 3,000 | 2,500 | 2,000 | 1,500 | 1,000 | (n.a.) |
| 0.180 | | | 5,760 | 5,040 | 4,320 | 3,600 | 2,380 | 2,160 | 1,440 | (n.a.) |
| 0.250 | | | 8,000 | 7,000 | 6,000 | 5,000 | 4,000 | 3,000 | 2,000 | 1,000 |
| Ply Orientation | Sequence Number | | 32 | 28 | 24 | 20 | 16 | 12 | 8 | 4 |
| −20° | 1 | | | | | | | | | |
| +40° | 2 | | | | | | | | | |
| −20° | 3 | | | | | | | | | |
| +40° | 4 | | | | | | | | | |
| −20° | 5 | | | | | | | | | |
| +40° | 6 | | | | | | | | | |
| −20° | 7 | | | | | | | | | |
| +40° | 8 | | | | | | | | | |
| −20° | 9 | | | | | | | | | |
| +40° | 10 | | | | | | | | | |
| −20° | 11 | | | | | | | | | |
| +40° | 12 | | | | | | | | | |
| −20° | 13 | | | | | | | | | |
| +40° | 14 | | | | | | | | | |
| −20° | 15 | | | | | | | | | |
| +40° | 16 | | | | | | | | | |
| −20° | 17 | | | | | | | | | |
| +40° | 18 | | | | | | | | | |
| −20° | 19 | | | | | | | | | |
| +40° | 20 | | | | | | | | | |
| −20° | 21 | | | | | | | | | |
| +40° | 22 | | | | | | | | | |
| −20° | 23 | | | | | | | | | |
| +40° | 24 | | | | | | | | | |
| −20° | 25 | | | | | | | | | |
| +40° | 26 | | | | | | | | | |
| −20° | 27 | | | | | | | | | |
| +40° | 28 | | | | | | | | | |
| −20° | 29 | | | | | | | | | |
| +40° | 30 | | | | | | | | | |
| −20° | 31 | | | | | | | | | |
| +40° | 32 | | | | | | | | | |

| Ply Thickness [mm] | Layup Thickness [mm] | | | | | | | |
|---|---|---|---|---|---|---|---|---|
| 0.125 | 4.000 | 3.500 | 3.000 | 2.500 | 2.000 | 1.500 | 1.000 | (n.a.) |
| 0.180 | 5,760 | 5,040 | 4,320 | 3,600 | 2,880 | 2,160 | 1,440 | (n.a.) |
| 0.250 | 8,000 | 7,000 | 6,000 | 5,000 | 4,000 | 3,000 | 2,000 | 1,000 |
| Ply Orientation / Sequence Number | 32 | 28 | 24 | 20 | 16 | 12 | 8 | 4 |

Fig. 8

COMPOSITE STRUCTURAL ELEMENT AND TORSION BOX

CROSS-REFERENCE TO RELATED APPLICATION

This application claims priority to European Patent Application No. 14 156 107.6, filed Feb. 21, 2014, which is incorporated herein by reference in its entirety.

TECHNICAL FIELD

The present embodiment described herein relates to a composite structural element, in particular a rib or a spar, for a torsion box of an aircraft structure such as a vertical tailplane.

BACKGROUND

With regard to aircraft structures, torsion boxes are typically applied to stabilize large elements such as horizontal and vertical tailplanes or airfoils while ensuring a low weight of these components. Typically, torsion boxes contain a stabilizing structure consisting of ribs and spars which are arranged in a generally crosswise or net-shaped manner to support thin-walled sheets or skins which are attached to a top and bottom surface of this net-shaped arrangement. The sheets or skins may further be stiffened by stringers. To the torsion box, usually a separate leading edge and trailing edge structure, a root joint and a tip are attached to complete the tailplane or airfoil.

In this connection, the ribs and spars are typically longitudinally shaped and comprise a substantially planar main section. The ribs and spars may, for example, be designed with a T-, I- or C-shaped cross-section, wherein the planar main section configures the web section and may be reinforced with stiffeners. The planar main section may generally be designed as a thin element, for example with a thickness of a few centimeters or millimeters. In case of a tailplane or airfoil, the spars are typically arranged to extend transverse to a main longitudinal axis of the aircraft which coincides with a forward flight direction. Accordingly, the spars define a leading and trailing edge of the torsion box with regard to said flight direction. Further spars may be arranged in between these leading and trailing edges and may extend substantially in parallel thereto. The ribs, on the other hand, usually run approximately in parallel to said longitudinal axis of the aircraft and are arranged to connect the spars with each other.

In order to meet weight requirements, it is well-known to use lay-ups consisting of single plies of fiber-reinforced composite materials for designing such ribs and spars. A preferred composite material, in particular for designing vertical tailplane components, is CFRP (carbon fibre reinforced plastic) made of thin plies (0.1 to 0.25 mm) which are stacked to a required thickness. In case of plies with a substantially unidirectional fiber orientation, it is known to specifically select the orientation of the single plies relative to each other and relative to expected main loads on the structural element. By doing so, a specific strength and/or stiffness with regard to specific load scenarios can be achieved.

For a composite structural element of the above-specified type, a coordinate system can be defined with a first axis extending along the longitudinal axis of this structural element and a second axis extending perpendicular to the longitudinal axis within the planar main section and defining an angle of 90° with the first axis. For designing such structural elements out of fiber-reinforced composite materials, so far lay-ups have been applied containing at least one pair of plies arranged in said lay-up such that their directions of fiber orientation extend at an angle of +/−45° in said coordinate system. Similarly, lay-ups containing at least one pair of plies with a fiber orientation of +/−60° in said coordinate system are known. However, the known lay-ups possess an undesirably high weight which results, amongst others, in higher fuel costs when operating the aircraft.

Accordingly, an embodiment provides a composite structural element of the above-mentioned type which possesses a high stability and in particular stiffness at a low overall weight.

A composite structural element, in particular a rib or a spar, specifically for use in a torsion box of an aircraft structural component such as a vertical tailplane is provided. The structural element comprises a substantially planar main section defining a coordinate system with a first axis extending along the longitudinal axis of the structural element and a second axis extending perpendicular to the longitudinal axis within the planar main section and defining an angle of +90° with the first axis. The structural element contains a lay-up of single plies consisting of a fiber-reinforced composite material with a substantially unidirectional fiber orientation. The lay-up comprises at least one symmetrically arranged pair of a first and a second ply which are arranged in the lay-up such that the direction of fiber orientation extends in the coordinate system at an angle in the range of −17° to −23° for the first ply and +37° to +43° for the second ply.

The second axis may generally extend in a direction of or parallel to a main load acting on the structural element, wherein the main load acts transversely with respect to the longitudinal axis. The first axis may be chosen to define an angle of 0°. Furthermore, the composite structural element may be designed within an overall longitudinal shape, thus defining the position and orientation of the longitudinal axis in accordance with the shape.

For the present embodiment, the structural element contains at least one planar main section with the lay-up as specified above, wherein this planar main section may in particular represent the major load-carrying portion of the structural element. Furthermore, this planar main section may specifically be designed to be free of bends or curvatures.

As is well known in the field of fiber-reinforced composite materials, a symmetrical arrangement of single plies within a lay-up describes a symmetrical stacking or sequence of these plies with regard to a geometric center plane of the lay-up. Furthermore, a unidirectional fiber orientation generally expresses an orientation of the fibers such that they run substantially in one common direction.

The structural element according to the embodiment contains a lay-up which distinguishes itself in particular in terms of the fiber orientation of the single plies arranged therein. With regard to the previously described conventional lay-ups, it has been determined that shear forces represent a major load that the composite structural elements, such as ribs and spars, are exposed to. A mode of failure which may arise due to these shear forces is buckling.

The known lay-ups as described above are, however, mainly designed to withstand only one of these main shear forces typically defined as positive shear forces resulting from a so-called direct loading. With regard to such positive shear forces, the conventional lay-ups generally provide a reliable stability and in particular sufficient buckling resistance. Yet, with regard to shear loads in opposite directions, also called negative shear forces or opposite loading, the conventional lay-ups provide a comparably low buckling resistance. As a consequence, the lay-ups have to be built of a larger number of single plies and/or plies having a greater thickness.

By arranging the single plies within a lay-up according to the embodiment, a composite structural element containing this lay-up possesses much higher stiffness when compared to the conventional lay-ups. This relates in particular to an improved resistance with regard to shear forces of direct and opposite loading directions leading to positive and negative shearflows. In fact, it has been discovered that a structural element according to the embodiment possesses an almost equal buckling resistance with regard to both of these types of shear forces.

Accordingly, it is not necessary to compensate for a lower buckling resistance of the lay-up with regard to opposite shear loading by adding further plies and/or generally increasing the thickness of the lay-up. Instead, with a lay-up according to the embodiment, a good compromise between a buckling resistance in both directions of shear forces and the required amount and/or thickness of plies is reached. Therefore, an overall weight reduction of the structural element is achieved.

In the specific lay-up according to the embodiment, a nearly equal buckling resistance to both main types of shear loads may be achieved for a large variety of fiber-reinforced composite materials and over a large range of thicknesses of these materials. In other words, the lay-up according to the embodiment provides a preferable buckling resistance almost independently of the selected material and/or its thickness.

In a preferred embodiment, the first ply is arranged in the lay-up such that the direction of fiber orientation extends in the coordinate system at an angle in the range of −18° to −22°. In a further preferred embodiment, this angular range is −19° to −21°. Likewise, in a preferred embodiment, the second ply is arranged in the lay-up such that the direction of fiber orientation extends in the coordinate system at an angle in the range of +38° to +42°. In a further preferred embodiment, this angular range is +39° to +41°. It will be understood, that the above described preferred embodiments with regard to the angular ranges for arranging the first and second ply may be combined arbitrarily with each other to form a lay-up for a structural element according to the embodiment.

In a preferred embodiment, the direction of fiber orientation of the first ply extends in the coordinate system at an angle of approximately −20°. In this context, the term "approximately" generally denotes a tolerance of +/−1° with regard to the direction of fiber orientation.

In another preferred embodiment, the direction of fiber orientation of the second ply extends in said coordinate system at an angle of approximately +40°. Similar to the above, the term "approximately" denotes a tolerance of +/−1° with regard to the direction of fiber orientation.

The first ply may form an outermost layer of the lay-up. It has been found that by arranging the first ply in this way, the buckling resistance of the lay-up can even further be increased. The lay-up may constitute at least part of a web of the structural element. The web may be configured by the planar main section of the structural element which is typically exposed to particularly high shear forces. Flange sections may be attached to this web to e.g. define T-, I- or C-shaped cross-sections of the structural element. By placing the lay-up according to the embodiment in the web, the overall stability of the structural element can be increased considerably. The structural element may be configured as a unitary member comprising the lay-up. This is in particular advantageous with regard to the manufacturing process of the structural element and avoids further steps for joining single pieces or introducing additional fastening means.

In a preferred embodiment, the lay-up comprises at least one symmetrically arranged pair of first and second plies. In other words, the lay-up does not contain any further plies with a different direction of fiber orientation in the coordinate system. By doing so, a minimum number of plies for ensuring the required stability and, in particular, buckling resistance can be used for building up the lay-up, thus keeping the weight to a minimum.

As an alternative, the lay-up may further comprise at least one ply with a direction of fiber orientation extending in the coordinate system at an angle in the range of −3° to +3°. In a further preferred embodiment, this angular range amounts to −2° to +2°. In a further preferred embodiment, this angular range amounts to −1° to +1°. In a highly preferred embodiment, the respective angle amounts to 0°.

Likewise, the lay-up may further comprise at least one ply with a direction of fiber orientation extending in the coordinate system at an angle in the range of +87° to +93°. In a further preferred embodiment, this angular range is to +88° to +92°. In a further preferred embodiment, this angular range is +89° to +91°. In a highly preferred embodiment the respective angle is +90°.

The above-described further plies may be provided for rendering the lay-up according to the embodiment more stable during its production as well as for generally improving its bearing characteristics. These plies may also be arranged symmetrically within the lay-up.

The structural element may comprise at least two stiffeners extending substantially in a direction of +90° in the coordinate system along the planar main section of the structural element. In other words, the stiffeners may extend substantially transversely with respect to the longitudinal axis of the structural element. The stiffeners may be configured as specifically shaped sections of the structural element, for example, in form of beads or corrugations. Alternatively, the stiffeners may, for example, take the form of additional rigid elements attached to an outside of the structural element. In this way, forces acting in a direction transverse to the longitudinal axis of the structural element can be better compensated for. The stiffeners and the bending stiffness and pitch between them may be chosen in such a way that under shear loading, the local buckling modes between two stiffeners appear prior to global buckling modes.

The area between the two stiffeners may have an aspect ratio as defined by the ratio of its longest and shortest extension of not less than 1.5. On the other hand, the area between the two stiffeners may have an aspect ratio as defined by the ratio of its longest and shortest extension of not more than 4.0. It has been found that the structural element according to the embodiment possesses a particularly high stability when staying above respectively below these threshold values.

In a preferred embodiment, the lay-up does not comprise more than 32 plies in total. This ensures that the structural element containing the lay-up remains generally thin and may be reduced in weight. Likewise, in a preferred embodiment, the lay-up does not exceed a thickness of 8 mm. It may equally be provided that only the thickness resulting from a summation of the individual thicknesses of the first and second plies does not exceed an amount of 8 mm. In this case any further plies, e.g. with a fibre orientation of 0° or +90°, are not considered for determining the respective thickness.

The embodiment furthermore relates to a torsion box for an aircraft structural component, in particular a vertical tailplane, comprising at least one composite structural element according to any of the previously discussed embodiments.

BRIEF DESCRIPTION OF THE DRAWINGS

The various embodiments will hereinafter be described in greater detail with reference to the appended schematic drawings, wherein

FIG. 4 is a view of a lay-up as contained in the ribs and spars of FIGS. 2 and 3;

FIG. 5 is a schematic view of a spar according to an embodiment comprising the lay-up of FIG. 4;

FIG. 6 is a schematic view of a rib according to an embodiment comprising the lay-up of FIG. 4;

FIG. 7 is a table illustrating a possible lay-up design comprising up to 32 plies of the first and second type in total; furthermore, a table is shown illustrating the lay-up thickness depending on the amount of plies within the lay-up and the thickness of a single plié; and FIG. 8 is a table illustrating a possible lay-up design consisting of up to 32 plies in total and comprising plies of the first and second type as well as further plies with fibre orientations of 0° and +90°; furthermore, a table is shown illustrating the lay-up thickness depending on the amount of plies within the lay-up and the thickness of a single plie.

DETAILED DESCRIPTION

Figure 1:
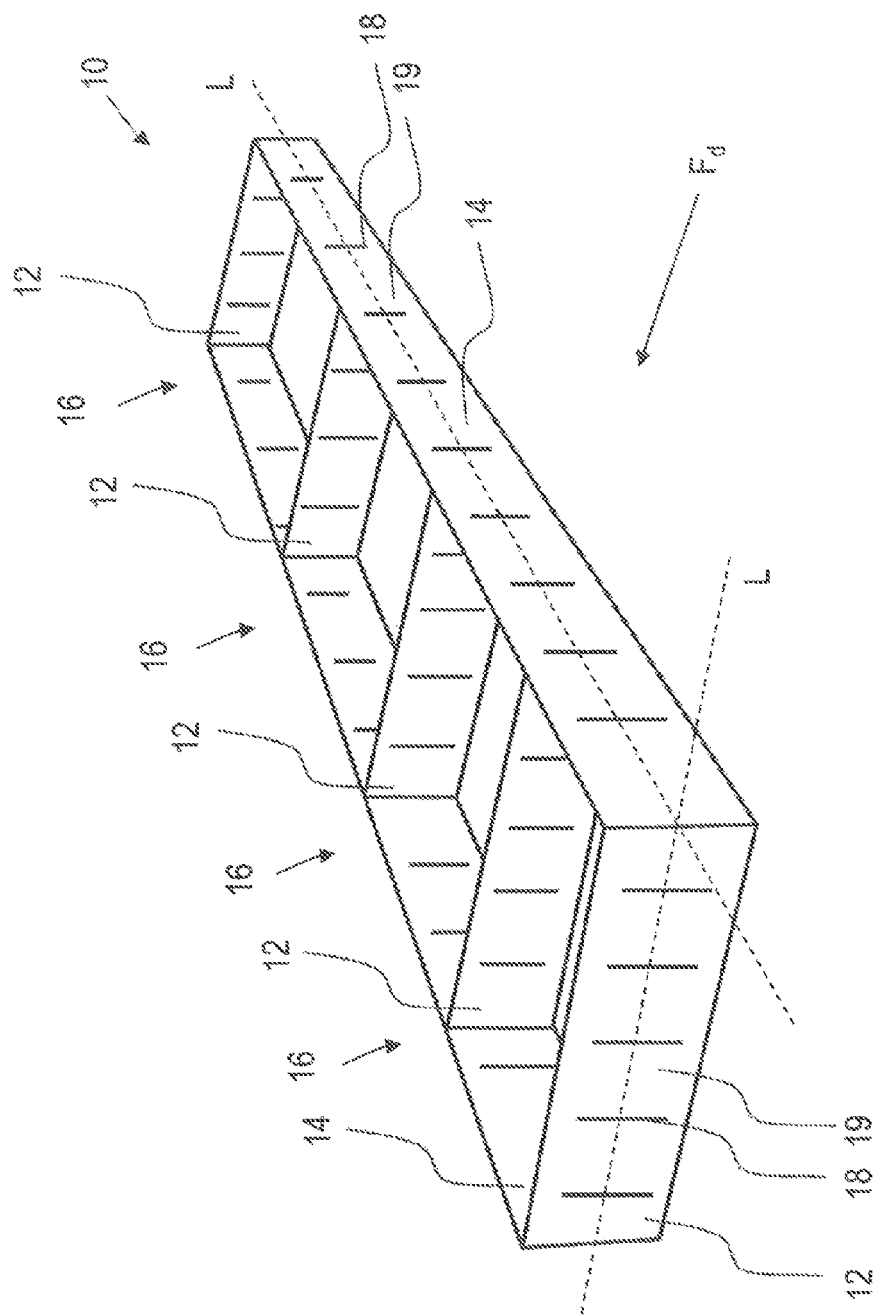
FIG. 1 is a perspective view of a schematically illustrated torsion box for an aircraft structural component comprising a number of composite structural elements according to an embodiment in the form of several ribs and spars.

FIG. 1 is a perspective view of a schematically illustrated torsion box 10 for a vertical tailplane of an aircraft. The torsion box 10 comprises two types of composite structural elements which are designed with a generally longitudinal shape and take the form of ribs 12 and spars 14 each having a corresponding longitudinal axis L as illustrated in FIG. 1.

With regard to a forward flight direction $F_d$ of the aircraft, the torsion box, when installed in the aircraft, is arranged with the spars 14 extending substantially transverse to the forward flight direction $F_d$ and the ribs 12 extending substantially in parallel to the forward flight direction $F_d$. In FIG. 1, the left hand spar 14 therefore defines a trailing edge and the right hand spar 14 therefore defines a leading ledge of the torsion box 10. The ribs 12 are arranged to extend between the spars 14 and are connected thereto by conventional means. Accordingly, the ribs 12 and spars 14 are arranged in a substantially crosswise or net-shaped manner to define the torsion box 10. Thus, two adjacent ribs 12 and two opposite sections of the spars 14 define a substantially rectangular hollow space 16 within the torsion box 10. As is well-known, the torsion box 10 is completed with non-illustrated thin-walled sheets or skins covering, in FIG. 1, the top and bottom surfaces of the torsion box 10. These skins may further be stiffened by stringers running substantially in parallel to the spars 14.

Referring to FIG. 1, the ribs 12 and spars 14 are provided with a plurality of stiffeners 18 extending substantially transverse to the respective longitudinal axes L and being distributed along these longitudinal axes L. The area between two adjacent stiffeners 18 is referred to as a "bay 19" in the following. For illustrative purposes, only one stiffener 18 and one bay 19 is provided with reference signs for only one of the ribs 12 and the spars 14.

Figure 2:
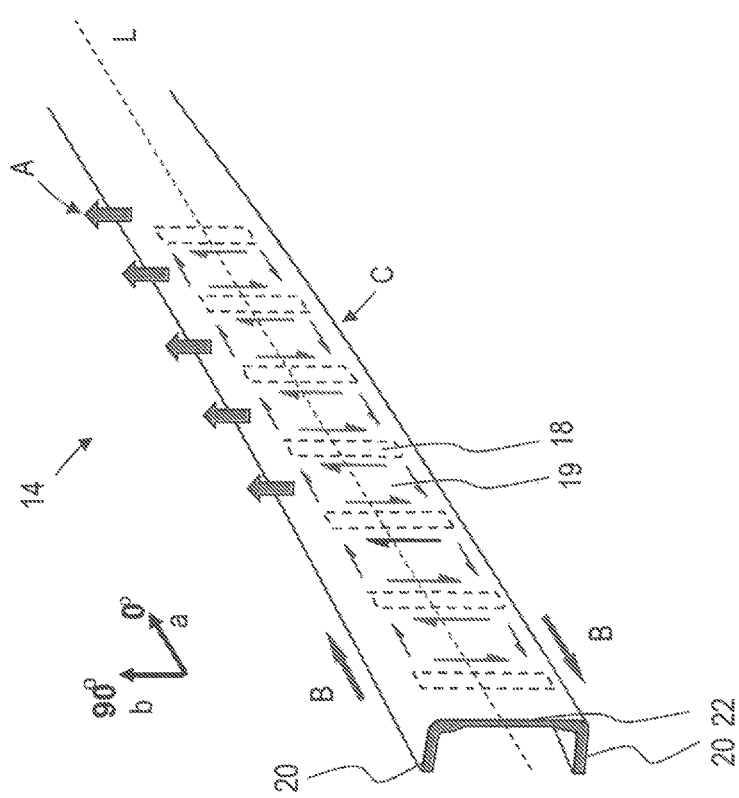
FIG. 2 is a detailed partial perspective view of a C-profiled spar as installed in the torsion box of FIG. 1.

FIG. 2 depicts a spar 14 of the torsion box of FIG. 1 in greater detail with the orientation corresponding to that of the right-hand spar 14 in FIG. 1. In FIG. 2, the spar 14 is shown in a partial perspective view and configured with a C-shaped profile. Accordingly, the spar 14 comprises an upper and a lower flange section 20 as well as a planar main section 22 configuring a web section of the spar 14 which extends between the flange sections 20 and substantially transverse thereto. Within the planar main section 22, the stiffeners 18 are arranged confining numerous bays 19.

Furthermore, the major loads that the spar 14 is exposed to during an operation of the aircraft as well as the stresses resulting therefrom are indicated by various arrows in FIG. 2. A top row of arrows A pointing upwards indicates the direction of a main air load acting on the spar 14. Furthermore, two arrows B extending in parallel to the longitudinal axis L indicate further forces as experienced by the spar 14. The main shear forces resulting from the forces according to arrows A and B are indicated by arrows C with asymmetric tips which extend within the planar main section 22 and bays 19 along different directions. Of course, there may exist further loads acting on the spar 14, for example, compressive forces in a direction opposite to the arrows A, which are mainly compensated for by the stiffeners 18.

Moreover, a coordinate system is shown in FIG. 2 comprising a first axis "a" extending along the longitudinal axis L and defining an angle of 0° and a second axis "b" extending perpendicular to the longitudinal axis L within the planar main section 22. Hence, the second axis "b" defines an angle of +90° with the first axis "a". In the shown case, the second axis "b" extends in parallel to the arrows A and in the direction of the respective main air load.

With respect to this coordinate system, direct shear loading leading to positive shear forces and shear flows is defined as leading to a positive shear angle in the coordinate system, i.e., a shear angle as induced by the forces according to arrows B in FIG. 2. The scenario of opposite shear loading leading to negative shearflows occurs in the opposite case, i.e., with the arrows B respectively pointing in opposite directions.

With regard to the prevailing stresses within the planar main section 22, it is therefore obvious that a high buckling resistance is preferable against both of direct and opposite shear loading.

Figure 3:
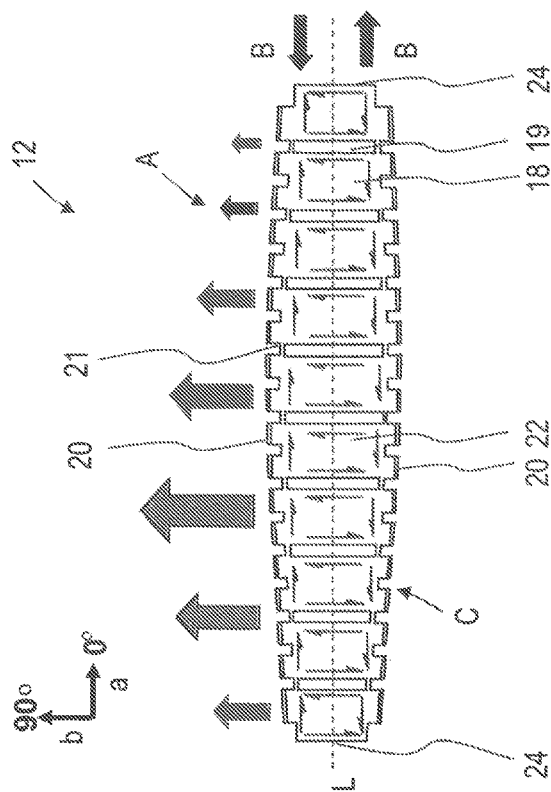
FIG. 3 is a detailed side view of a rib as installed in the torsion box of FIG. 1.

FIG. 3 is a detailed view of a rib 16 of the torsion box of FIG. 1 as well as the major loads and stresses in connection therewith. To avoid repetitions, the same features are associated with the same reference signs in the following when compared to the previous figures.

FIG. 3 represents a side view of the ribs 12 as obvious from the extension of the longitudinal axis L. The rib 12 is configured with a slightly oval shape as well as an I-shaped cross-section (not illustrated in FIG. 3). Accordingly, at the upper and lower edges in FIG. 3, the rib 12 is provided with flange sections 20 and a main planar section 22 configuring a web section extending therebetween. At the outer ends of rib 12 along the longitudinal axis L, connecting sections 24 are provided which are complementary shaped to the C-profile of the spars 14 in order to be connected thereto.

Furthermore, along the flange sections 20, several receiving sections 21 are provided to receive stringers as attached to a top and bottom sheet, respectively, of the skin of the torsion box 10.

Similar to the spar 14 as discussed in connection with FIG. 2, a main air load indicated by arrows A acts in substantially transverse direction to the longitudinal axis L on the rib 12. In addition, forces as indicated by arrows B act in the direction of the longitudinal axis L thus leading to main shear forces according to arrows C within the web section 22 of rib 12 along two different directions.

Again, a coordinate system is defined by a first axis "a" extending along the longitudinal axis L of rib 12 and defining an angle of 0°, whereas a second axis "b" extends perpendicular to the longitudinal axis within the planar main section 22 and defines an angle of 90° with the first axis "a". In the shown case, the second axis "b" extends in parallel to the arrows A and thus in the direction of the respective main air load.

To compensate for the main shear loads as discussed with respect to the previous figures, the ribs 12 and spars 14 are configured as unitary members and are made from of a lay-up of single plies of fiber composite material as further elaborated upon in the following.

In FIG. 4, the composition of the lay-up 28 for forming the ribs 12 and spars 14 is shown. As obvious from this figure, the lay-up 28 comprises a first ply 30 which forms an outermost layer and is configured of a fiber-reinforced composite material with a unidirectional fiber orientation as schematically indicated by lines 32. The first ply 30 is arranged within the lay-up 28 such that the direction of fiber orientation 32 extends at an angle of −20° in the respective coordinate systems of the ribs 12 and the spars 14 as discussed with respect to FIGS. 2 and 3.

In addition, the lay-up according to FIG. 4 comprises a second ply 34 of a similar material which is arranged in the lay-up such that the direction of fiber orientation 32 extends at an angle of +40° with respect to said coordinate system.

As is well known, the lay-up 28 is arranged in a symmetrical manner with respect to a geometric center plane, meaning that a sequence of the first and second plies 30 and 34 is mirrored with respect to the center plane. This is accordingly indicated in FIG. 4 by the dashed lines representing further plies below of a non-marked geometrical centre plane. The pair of first and second plies ensures that the ribs 12 and spars 14 as depicted in FIGS. 2 and 3 are provided with a sufficient stiffness and in particular possess a comparable buckling resistance in both direct and opposite shear loading directions.

In FIGS. 5 and 6, the spar 14 and rib 12 of FIGS. 2 and 3 are schematically illustrated with the arrows "c" and "d" marking the respective directions of fiber orientation 32 of the first and second plies 30 and 34 of lay-up 28 within the main planar section 22 of these structural elements. The angular amounts in these figures refer again to the above-described coordinate systems as defined by the ribs 12 and spars 14.

As further obvious from FIGS. 5 and 6, the bays 19 are provided with a long main extension X as well as shorter minor extension Y. The ratio of the longest extension X and the shortest extensions Y does, in both depicted embodiments, neither exceed a value of 4.0 nor falls below a value of 1.5.

FIGS. 7 and 8 contain tables for illustrating further examples of lay-up designs for a structural element 14, 16 according to an embodiment. In both cases the lay-up contains up to 32 plies 30 and 34 in total, wherein the single types of plies 30 and 34 are marked with individually structured lines. In FIG. 7, the lay-up solely comprises plies of the first and second type 30 and 34, i.e., plies with a fibre orientation 32 of either +40° or −20°. Again, the symmetrical stacking of the single piles 30 and 32 within the lay-up becomes obvious, wherein the geometrical centre plane M is located in between the plies 30, 34 marked 16 and 17 respectively. The most basic form of a lay-up according to the embodiment is represented by a sequence of plies 30 and 34 marked 15 to 18 respectively.

In FIG. 8, a lay-up design comprising further plies with fibre orientations of 90° and 0° degrees is illustrated. These further plies may be arranged symmetrically (see e.g. plies marked 5 and 28) or non-symmetrically in the lay-up (see e.g. plies marked 16 and 17).

Furthermore, both FIGS. 7 and 8 contain a table illustrating the thickness of a lay-up depending on the amount of the single plies as well as the individual thicknesses of these plies. For lay-ups comprising 32 plies as described above and assuming a uniform ply thickness throughout the lay-up, the thickness of a single ply may amount to 0.250 mm for reaching a maximum ply thickness of 8 mm.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A composite structural torsion box rib or torsion box spar comprising:
a substantially planar main section defining a coordinate system with a first axis extending along a longitudinal axis of the structural element and a second axis extending perpendicular to the longitudinal axis within a planar main section and defining an angle of +90° with the first axis; wherein the main section comprises a lay-up of single plies comprised of a fiber-reinforced composite material with a substantially unidirectional fiber orientation, wherein the lay-up comprises at least one pair of a first and a second ply which are arranged in the lay-up such that the direction of fiber orientation extends in the coordinate system at an angle in the range of substantially −17° to −23° for the first ply and substantially +37° to +43° for the second ply; and wherein the first ply is directly adjacent to the second ply.

2. The composite structural torsion box rib or torsion box spar of claim 1, wherein the direction of fiber orientation of the first ply extends in the coordinate system at an angle of approximately −20°.

3. The composite structural torsion box rib or torsion box spar of claim 1, wherein the direction of fiber orientation of the second ply extends in the coordinate system at an angle of approximately +40°.

4. The composite structural torsion box rib or torsion box spar of claim 1, wherein the first ply forms an outermost layer of the lay-up.

5. The composite structural torsion box rib or torsion box spar of claim 1, wherein the lay-up comprises at least part of a web of the structural element.

6. The composite structural torsion box rib or torsion box spar of claim 1, wherein the structural element is configured as a unitary member comprising the lay-up.

7. The composite structural torsion box rib or torsion box spar of claim 1, wherein the lay-up further comprises at least one ply with a direction of fiber orientation extending in the coordinate system at an angle in the range of substantially −3° to +3°.

8. The composite structural torsion box rib or torsion box spar of claim 1, wherein the lay-up further comprises at least one ply with a direction of fiber orientation extending in the coordinate system at an angle in the range of substantially +87° to +93°.

9. The composite structural torsion box rib or torsion box spar of claim 1, further comprising at least two stiffeners extending substantially in a direction of +90° in the coordinate system along the planar main section of the structural element.

10. The composite structural torsion box rib or torsion box spar of claim 9, wherein the area between the two stiffeners has an aspect ratio as defined by the ratio of its longest and shortest extension of not less than 1.5.

11. The composite structural torsion box rib or torsion box spar of claim 9, wherein area between the two stiffeners has an aspect ratio as defined by the ratio of its longest and shortest extension of not more than 4.0.

12. The composite structural torsion box rib or torsion box spar of claim 10, wherein area between the two stiffeners has an aspect ratio as defined by the ratio of its longest and shortest extension of not more than 4.0.

13. The composite structural torsion box rib or torsion box spar of claim 1, wherein the lay-up does not comprise more than 32 plies.

14. The composite structural torsion box rib or torsion box spar of claim 1, wherein the lay-up does not exceed a thickness of 8 mm.

15. The composite structural torsion box rib or torsion box spar of claim 1, wherein the lay-up comprises a first pair of the first and the second ply and a second pair of the first and the second ply, wherein the first and second pair are symmetrically arranged within the lay-up about a geometric center plane of the lay-up.

16. A composite structural torsion box rib or torsion box spar comprising:
a substantially planar main section defining a coordinate system with a first axis extending along a longitudinal axis of the structural element and a second axis extending perpendicular to the longitudinal axis within a planar main section and defining an angle of +90° with the first axis; wherein the main section comprises a lay-up of single plies comprised of a fiber-reinforced composite material with a substantially unidirectional fiber orientation, wherein the lay-up comprises at least one pair of a first and a second ply which are arranged in the lay-up such that the direction of fiber orientation extends in the coordinate system at an angle in the range of substantially −17° to −23° for the first ply and substantially +37° to +43° for the second ply, wherein the lay-up comprises a first pair of the first and the second ply and a second pair of the first and the second ply, wherein the first and second pair are symmetrically arranged within the lay-up about a geometric center plane of the lay-up, and wherein in each pair of plies, the first ply is directly adjacent the second ply.

17. An aircraft structural torsion box comprising:
a composite structural element having a substantially planar main section defining a coordinate system with a first axis extending along a longitudinal axis of the structural element and a second axis extending perpendicular to the longitudinal axis within a planar main section and defining an angle of +90° with the first axis, wherein the main section is formed from a lay-up of single plies comprised of a fiber-reinforced composite material with a substantially unidirectional fiber orientation, wherein the lay-up comprises at least one pair of a first and a second ply which are arranged in the lay-up such that the direction of fiber orientation extends in the coordinate system at an angle in the range of substantially −17° to −23° for the first ply and substantially +37° to +43° for the second ply; and wherein the first ply is directly adjacent to the second ply.

18. The aircraft structural torsion box of claim 17 wherein the lay-up comprises a first pair of the first and the second ply and a second pair of the first and the second ply, wherein the first and second pair are symmetrically arranged within the lay-up about a geometric center plane of the lay-up.

* * * * *